United States Patent
Guthrie et al.

(10) Patent No.: US 7,477,481 B2
(45) Date of Patent: Jan. 13, 2009

(54) BILAYER TRAILING SHIELD GAP FOR PERPENDICULAR HEAD

(75) Inventors: Hung-Chin Guthrie, Saratoga, CA (US); Ming Jiang, San Jose, CA (US); Aron Pentek, San Jose, CA (US); Sue Siyang Zhang, Saratoga, CA (US); Tsung Yuan Chen, San Jose, CA (US); Yinshi Liu, Foster City, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 555 days.

(21) Appl. No.: 11/195,227

(22) Filed: Aug. 1, 2005

(65) Prior Publication Data
US 2006/0002019 A1 Jan. 5, 2006

Related U.S. Application Data

(63) Continuation-in-part of application No. 10/836,867, filed on Apr. 30, 2004.

(51) Int. Cl.
*G11B 5/23* (2006.01)
(52) U.S. Cl. ............................................. 360/119.03
(58) Field of Classification Search ............ 360/123.12, 360/319, 119.03
See application file for complete search history.

(56) References Cited

U.S. PATENT DOCUMENTS

| 6,851,178 | B2 | 2/2005 | Han et al. |
| 6,954,340 | B2 * | 10/2005 | Shukh et al. ................. 360/317 |
| 2004/0042126 | A1 * | 3/2004 | Watanabe et al. ............ 360/319 |

* cited by examiner

*Primary Examiner*—A. J. Heinz
(74) *Attorney, Agent, or Firm*—Law Offices of Imam

(57) ABSTRACT

A perpendicular write head for writing data onto tracks includes a main pole, a trailing shield and bilayer trailing shield gap layer between the main pole and the trailing shield and improving writing and track width control.

20 Claims, 5 Drawing Sheets

Ion Mill

BILAYER TRAILING SHIELD GAP FOR PERPENDICULAR HEAD

CROSS REFERENCE TO RELATED APPLICATIONS

Figure 1:
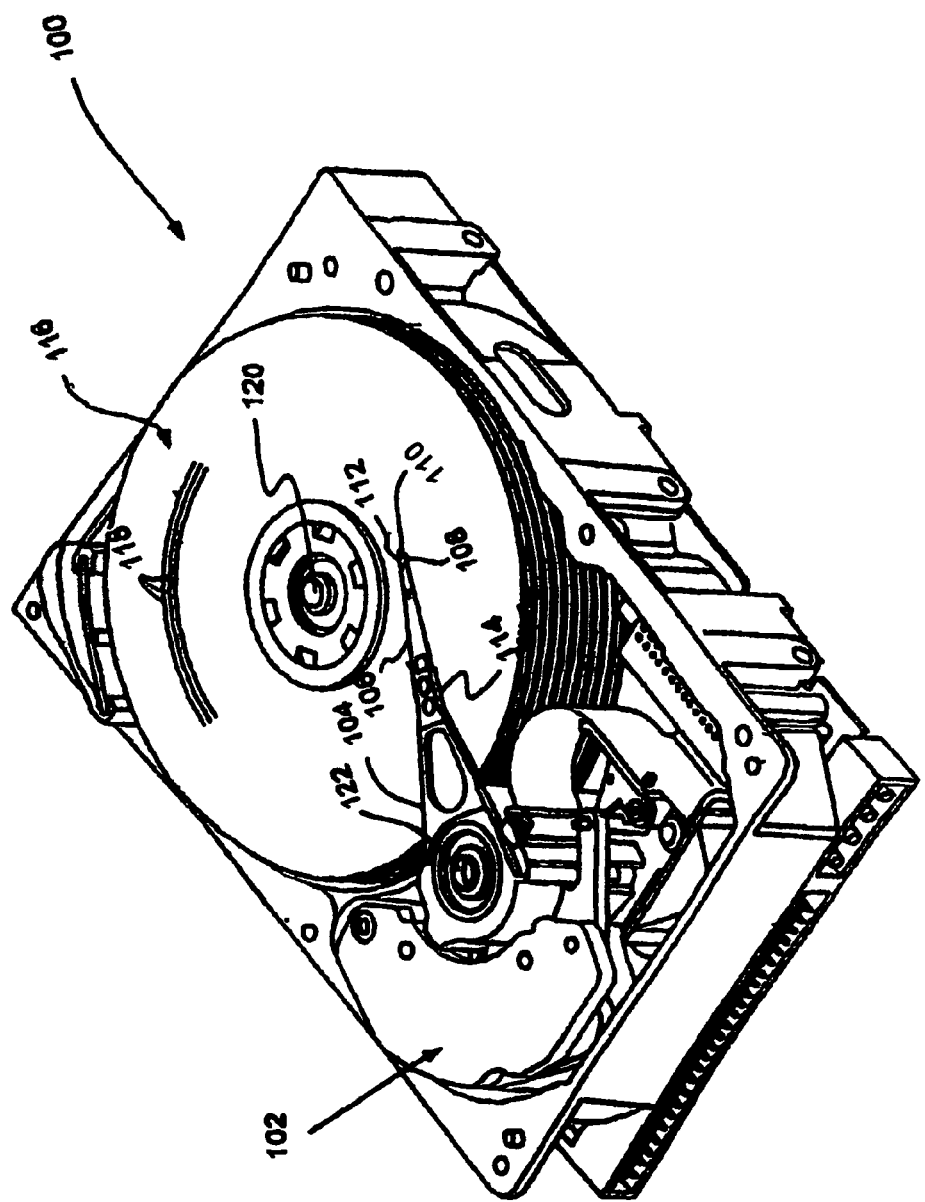

This application is a continuation-in-part of prior U.S. patent application Ser. No. 10/836,867 filed on Apr. 30, 2004 and entitled "HIGH MILLING RESISTANCE WRITE POLE FABRICATION FOR PERPENDICULAR RECORDING," the contents of which is incorporated herein by reference as though set forth in full and related to U.S. patent application Ser. No. 11/195,222, filed on Aug. 1, 2005, now U.S. Pat. No. 7,441,325, and entitled "PERPENDICULAR HEAD WITH TRAILING SHIELD", the contents of which is incorporated herein by reference, as though set forth in full, and related to U.S. patent application Ser. No. 11/195,532, filed on Aug. 1, 2005 and entitled "PERPENDICULAR WRITE POLE FORMATION USING DURIMIDE/ALUMINA HARD MASK WITHOUT CMP LIFTOFF", the contents of which is incorporated herein by reference, as though set forth in full.

BACKGROUND OF THE INVENTION

1. Field of the Invention

This invention relates generally to the field of perpendicular magnetic recording (or write) heads and more particularly, to a main pole and trailing shield thereof being made of bilayer trailing shield gap Rhodium (Rh) serving as a chemical mechanical planarization (CMP) stop layer and shield gap, part 1, and an Aluminum Oxide ($Al_2O_3$) layer serving as shield gap, part 2, and hard mask for controlling the pole width and beveling thereof to increase performance.

2. Description of the Prior Art

As the recording density of magnetic hard drives (or disk drives) increases, a physical limitation is experienced using longitudinal recording systems partly due to thermal relaxation known as super-paramagnetism. That is, the density requirements for meeting today's storage needs are simply not attainable with longitudinal recording systems. To provide further insight into this problem, it is anticipated that longitudinal recording systems will lose popularity as storage capacities in excess of about 150 Gigabytes-per-square-inches become a requirement. These and other factors have lead to the development and expected launch of perpendicular recording heads or write heads. Perpendicular recording is promising in pushing the recording density beyond the limit of longitudinal recording.

Accordingly, perpendicular recording potentially can support much higher linear density than longitudinal recording due to lower demagnetizing fields in recorded bits.

A magnetic recording head for perpendicular writing generally includes two portions, a writer for writing or programming magnetically-encoded information on a magnetic media or disk and a reader portion for reading or retrieving the stored information from the media.

The writer of the magnetic recording head for perpendicular recording typically includes a main pole and a return pole which are magnetically separated from each other at an air bearing surface (ABS) of the writer by a nonmagnetic gap layer, and which are magnetically connected to each other at a back gap closure (yoke). This structure is referred to as a single-pole write head because while a main pole and return pole are referred thereto, the return pole is not physically a pole, rather, it serves to close the loop with the main pole and the soft under layer of the media to form a magnetic flux circuit.

Positioned at least partially between the main and return poles are one or more layers of conductive coils encapsulated by insulation layers. The ABS is the surface of the magnetic head immediately adjacent to the recording medium.

To write data to the magnetic medium, an electrical current is caused to flow through the conductive coil, thereby inducing a magnetic field through the write head yoke, fringing across the write head gap at the media. By reversing the polarity of the current through the coil, the polarity of the data written to the magnetic media is also reversed.

The main and return poles are generally made of a soft magnetic material. The main pole generates magnetic field in the media during recording when the write current is applied to the coil.

In perpendicular recording heads, writing and erasing of information is performed by a single-pole write head. The main pole is composed of high moment magnetic materials, the most common example being cobalt-iron (CoFe) alloys or laminate layers.

With the advent of perpendicular recording heads, density has been greatly increased, as discussed hereinabove, which has lead to a greater need for accurate recording of data onto the desired track. That is, writing to adjacent tracks is highly undesirable because it causes corruption of data on adjacent tracks.

Perpendicular write heads generally have a trailing shield, side shields, a main pole and a bottom return pole. The main pole is generally shaped in a manner causing a tip or an extension thereof that is narrower than the remaining portion thereof to form a top pole. The side shields act to shield the main pole so as to reduce adverse affects on adjacent tracks during the writing of magnetic transitions (data) at a location on a given track. One of the problems associated with prior art perpendicular write heads is controlling the critical gap thickness, i.e. the thickness between the main pole and the trailing shield. Another problem associated with prior art perpendicular write heads is controlling main pole width and bevel angle. But perhaps the more severe problem therewith remains main pole damages and corner rounding caused from chemical mechanical planarization (CMP) process, such as described in further detail below.

In the perpendicular recording head with trailing shield, the main pole and trailing shield are separated by the gap layer, thus, requiring improvement for controlling the formation of the gap layer so as to have well-controlled critical gap thickness between the main pole and the trailing shield.

The main pole is generally beveled (or trapezoidal) in shape in an effort to reduce adjacent track writing. Controlling the pole width so as to better line up with the track to be written thereto needs further improvement, as does controlling the angle of the bevel of the bevel-shaped design of the main pole.

It is vital for the corners of the bevel of the main pole to be straight rather than rounded, which is often experienced during manufacturing of the main pole and trailing shield. Such corner rounding generally results in the magnetic field that is induced onto the disc to be curved rather than straight. This effect adversely impacts system performance by degrading accurate recording of data onto the disc, as well as, unnecessarily higher power consumption.

Thus, in light of the foregoing, there is a need for a perpendicular recording head having a main pole and trailing shield manufactured to pattern the main pole and to eliminate main pole corner rounding while having well-controlled critical gap thickness between the main pole and the trailing shield.

SUMMARY OF THE INVENTION

Briefly, one embodiment of the present invention includes a perpendicular write head for writing data onto tracks, including a main pole having a bilayer trailing shield gap layer between the main pole and the trailing shield to improve writing and track width control.

IN THE DRAWINGS

FIG. 1 shows a top perspective view of a disc drive 100 is shown in accordance with an embodiment of the present invention.

Figure 2:
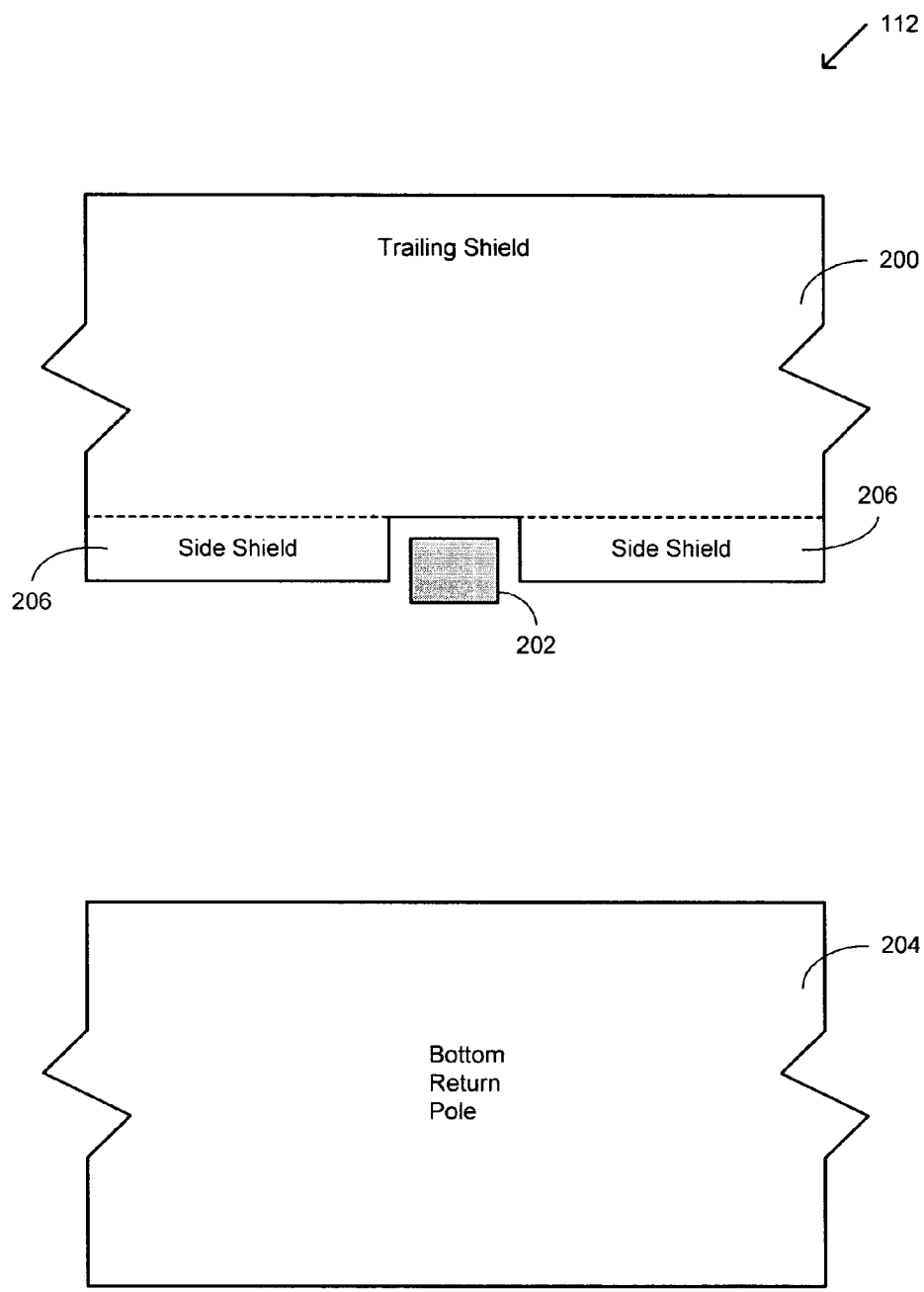

FIG. 2 shows an ABS view of a portion of the write head 112 having a trailing shield 200, side shields 206, a main pole 202 and a bottom return pole 204, which embodies the present invention.

FIGS. 3-8 show the relevant steps of manufacturing the main pole 202 and the trailing shield 200 in accordance with an embodiment and method of the present invention.

DETAILED DESCRIPTION OF THE PREFERRED EMBODIMENT

Referring now to FIG. 1, a top perspective view of a disk drive 100 is shown in accordance with an embodiment of the present invention. The disk 100 is shown to include a voice coil motor (VCM) 102, an actuator arm 104, a suspension 106, a flexure 108, a slider 110, a write (perpendicular) head 112, a head mounting block 114, and disk or media 116. Suspension 106 is connected to the actuator arm 104 at the head mounting block 114. The actuator arm 104 is coupled to the VCM 102. The disk 116 includes a plurality of tracks 118 and rotates about axis 120. The tracks 118 are circular, each extending circularly around the surface of the disk 116 for storing magnetically-encoded data or information using the perpendicular head 112, which will be discussed in greater detail with respect to further figures. The embodiments of the present invention reduce undesirable writing or programming of adjacent tracks, as will be apparent shortly.

During operation of the disk drive 100, rotation of the disk 116 generates air movement which is encountered by the slider 110. This air movement acts to keep the slider 110 afloat a small distance above the surface of the disk 116, allowing the slider 110 to fly above the surface of the disk 116. The VCM 102 is selectively operated to move the actuator arm 104 around the axis 120, thereby moving the suspension 106 and positioning the transducing head (not shown), which includes a main pole (not shown), by the slider 110 over the tracks 118 of the disk 116. It is imperative to position the transducing head properly to read and write data from and to the concentric tracks 118.

FIG. 2 shows an ABS view of a portion of the write head 112 having a trailing shield 200, side shields 206, a main pole 202 and a bottom return pole 204, which embodies the present invention. As earlier noted, the main pole is generally shaped in a manner causing a tip or an extension thereof that is narrower than the remaining portion thereof to form a main pole, such as the main pole 202. The side shields 206 act to shield the main pole so as to reduce adverse affects on adjacent tracks during the writing of magnetic transitions (data) at a location on a given track. It is the manufacturing and structure of the main pole 202, as will be described in further detail, that eliminates main pole damage and corner rounding resulting from CMP and that help to self-align the trailing shield 200 and that help to control the critical gap thickness between the main pole 202 and the trailing shield 200.

For information regarding other ways of forming or manufacturing the main pole, the reader is referred to U.S. patent application Ser. No. 11/195,222, filed on Aug. 1, 2005 and entitled "PERPENDICULAR HEAD WITH TRAILING SHIELD AND RHODIUM GAP PROCESS", the contents of which is incorporated herein by reference, as though set forth in full, and to U.S. patent application Ser. No. 11/195,532, filed on Aug. 1, 2005 and entitled "PERPENDICULAR WRITE POLE FORMATION USING DURIMIDE/ALUMINA HARD MASK WITHOUT CMP LIFTOFF, the contents of which is incorporated herein by reference, as though set forth in full.

Figure 3:
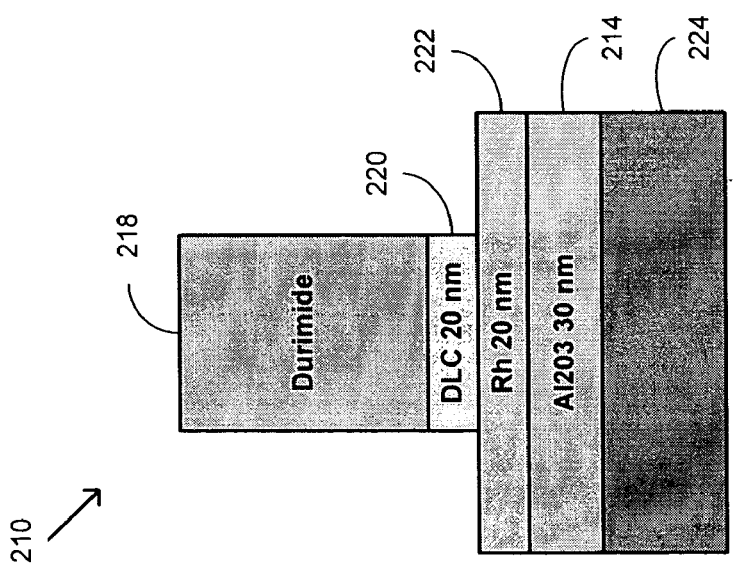

FIGS. 3-8 show the relevant steps of manufacturing the main pole 202 and the trailing shield 200, of FIG. 2, in accordance with an embodiment and method of the present invention. FIG. 3 shows the structure 210 to include a durimide layer 218 formed above a diamond-like carbon (DLC) layer 220, which is shown formed above a Rhodium (Rh) layer 222, which is, in turn, shown formed above an aluminum oxide ($Al_2O_3$) layer 214, which is, in turn, shown formed above a laminate layer main pole 224.

Regarding the size of each layer of the structure 210, in one embodiment of the present invention, the durimide layer 218 is 1000 nanometers in thickness, however, it can be anywhere from 500-1500 nanometers in thickness. In one embodiment of the present invention, the DLC layer 220 is 20 nanometers in thickness, however, it can be anywhere from 5-50 nanometers in thickness. In one embodiment of the present invention, the Rh layer 222 is 20 nanometers in thickness, however, it can be anywhere from 10-30 nanometers in thickness. In one embodiment of the present invention, the $Al_2O_3$ layer 214 is 30 nanometers in thickness, however, it can be anywhere from 10-30 nanometers in thickness. In one embodiment of the present invention, the laminate layer 224 is 240 nanometers in thickness, however, it can be anywhere from 10-300 nanometers in thickness.

The layer 218 serves as an underlayer or soft mask, and the layer 220 serves as a hard mask. The layers 222 and 214 serve as a shield gap layer defining a gap between the main pole and trailing shield, and also act to protect the top of the main pole 202 which is a critical dimension because it defines the track width after some processing steps, as will be shortly discussed. The layer 222 acts as a chemical mechanical planarization (CMP) stop layer while the layer 214 acts as a hard mask. The layer 220 serves as a stop layer, as well. The layer 224 is the main pole material. The layer 218 is essentially a main pole patterning mask.

Figure 4:
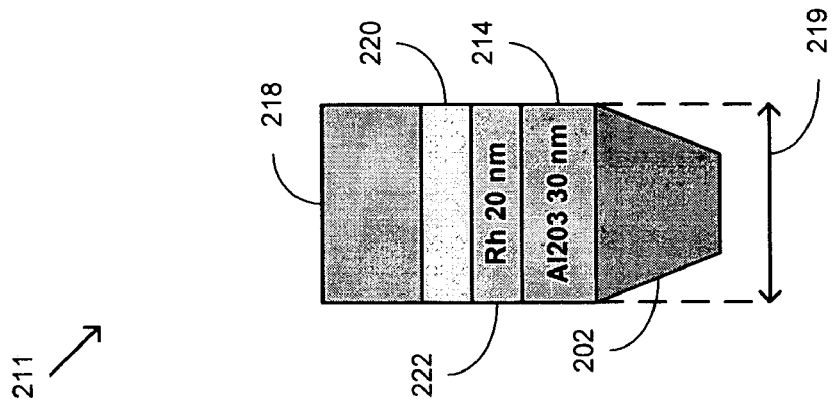

A multi-angle ion milling process is performed to obtain a structure 211 of FIG. 4 from that of the structure 210 of FIG. 3. During such process, the main pole 202 is formed. In one embodiment of the invention, the pole 202 is shown beveled in shape, in fact, the ion milling process defines the angle of the beveling. However, in other embodiments, the main pole may not be bevel-shaped. The layers 214 and 222 serve as gap layers and protect the main pole to eliminate corner rounding of the latter thereby providing improved track width control and angle control. As noted earlier, the track width is defined by the latter layers and shown, in FIG. 4, at 219. The layer 214 acts as a hard mask to protect the pole 202 and the layers 222 and 214, in combination, create a bilayer trailing shield gap layer while serving, along with the layer 220, as stop layers during a CMP process, to be discussed shortly. The bilayer trailing shield gap layer, being 50 nanometers (20 nanometers of Rh layer and 30 nanometers of $Al_2O_3$ layer) in one embodiment, offers a critical gap thickness between the main pole 202 and the trailing shield 200, which is formed of the layer 232 of FIG. 8 that is well controlled. Furthermore, the trailing shield 200, formed by metal plating in a step discussed hereinbelow, is self-aligned with the main pole 202. $Al_2O_3$ is favorable as a hard mask for the layer 214 because during the ion milling process, it helps to better control beveled angle and critical dimension.

The Rh layer 222 serves as a CMP stop layer. The layer 214 serves as a hard mask and is generally the same as alumina and allows for improved control of beveling or angle during milling, which improves track width control due to less erosion. Other alternatives for hard mask and therefore the layer 214 are SiO2, SiC, SiOxNy. AlSiOx, Ta TaOx, TaN and other similar material known to those skilled in the art.

Figure 5:
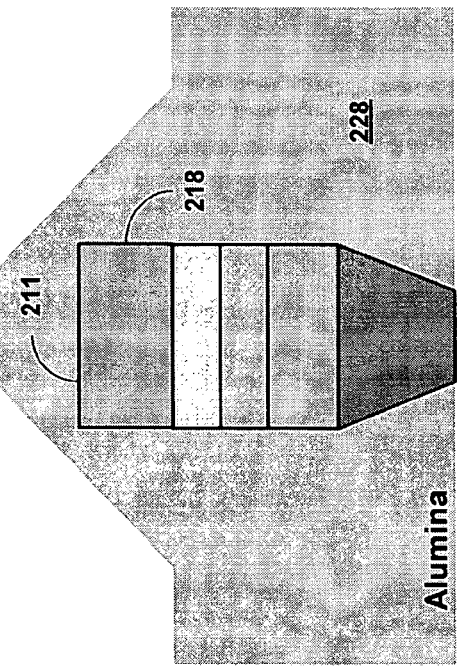

Next, as shown in FIG. 5, an alumina layer is deposited all around the structure 211. Due to the presence of the structure 211, a dome-shaped alumina structure 228 appears where the alumina appears raised above the structure 211. Alumina is the same as $Al_2O_3$. The layer 228 refilling of the structure 211, of FIG. 5, serves as support thereof.

Figure 6:
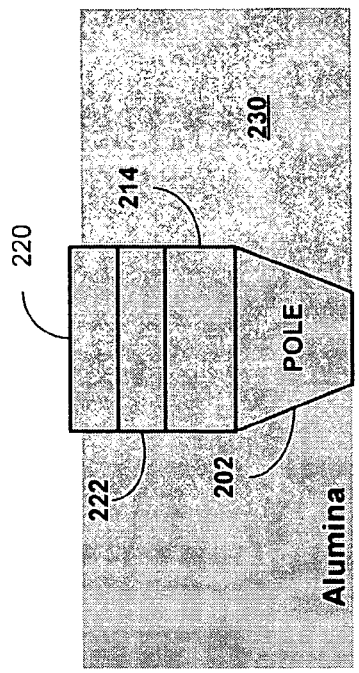

Next, in FIG. 6, a CMP process is performed to remove the durimide layer 218 with the DLC layer 220, the Rh layer 222 and the $Al_2O_3$ layer serving as CMP stop layers to eliminate main pole corner rounding. Rh and Alumina have a selectivity ratio of 1:1000. That is, removing 1000 nanometers of $Al_2O_3$ results in only removing 1 nanometers of Rh, which is, in part, the reason for the Rh layer 222 acting as a stop layer. The same holds true for DLC with respect to acting as a stop layer, i.e. its selectivity ratio with respect to $Al_2O_3$ is 1:1000. Along with the removal of the durimide layer 218, the part of the layer 228 that was used to cover the durimide layer 218 is also removed to leave behind only a part of the layer 228, the remaining layer is shown as the layer 230, in FIG. 7.

Figure 8:
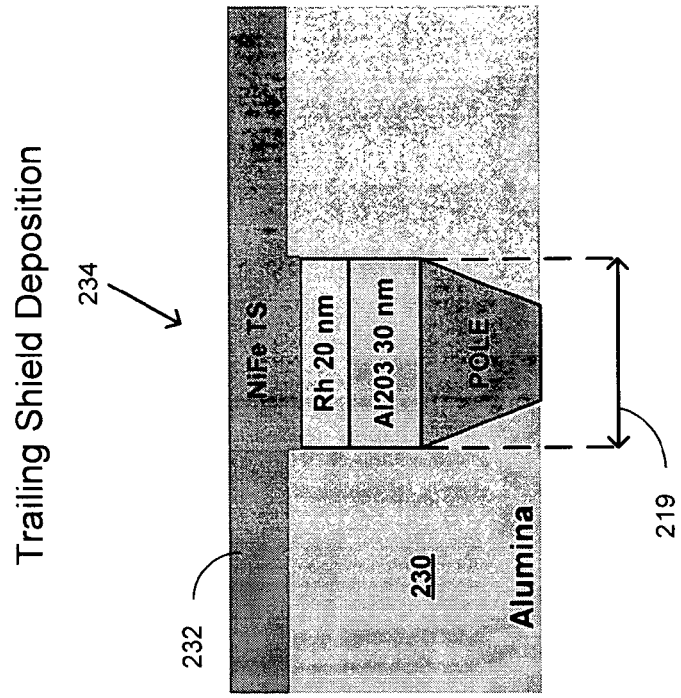
Figure 7:
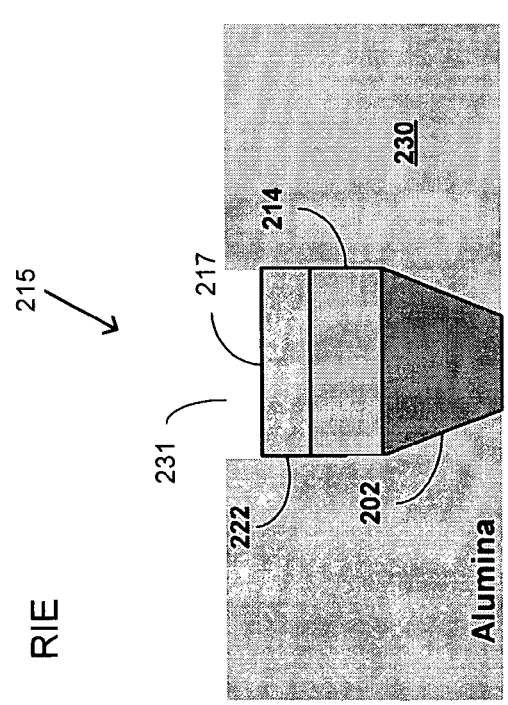

Next, a reactive ion etching process 215 is performed for removing the DLC layer 220 of previous figures to create the structure 217 of FIG. 7, leaving behind a trench 231 that is to be filled by metal. In FIG. 8, metal layer 232 is created by deposition of trailing shield or metal in the trench 231 (or metal gap layer) by plating in the trench 231 and over the top of the structure 217, the metal layer 232. In one embodiment of the present invention, the metal layer 232 is made of NiFe. As shown, the alumina layer 230 remains.

The Rh layer 222, which is a CMP stop layer, prevents the corner rounding problem of prior art techniques. The track width is basically at 219 of the structure 234 of FIG. 8 and some of the preceding figures. It is important to prevent erosion thereof for proper writing or programming of data onto tracks. The Rh layer 222 eliminates corner rounding to prevent curved transition of the magnetic flux utilized for programming data onto tracks, as apposed to the desired sharp transitions, which is achieved without corner rounding and damage. That is, the desired transitions should be perpendicular to the concentric tracks and in the presence of corner rounding, these transitions, rather than being sharp, i.e. perpendicular, are curved.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A perpendicular write head for writing data onto tracks, each having widths defining a track width comprising:

a main pole having a top surface;
a trailing shield self-aligned with the main pole; and
bilayer trailing shield gap layer formed between the top surface of the main pole and the trailing shield with the layers of the bilayer serving as hard mask and stop layer thereby improving track width control by protecting the top surface of the main pole.

2. A perpendicular write head, as recited in claim 1, wherein the bilayer trailing shield gap layer includes a Rhodium layer.

3. A perpendicular write head, as recited in claim 2, wherein the thickness of the Rhodium layer is within the range 10-30 nanometers.

4. A perpendicular write head, as recited in claim 1, wherein the bilayer trailing shield gap layer includes a hard mask.

5. A perpendicular write head, as recited in claim 1, wherein the bilayer trailing shield gap layer includes an $Al_2O_3$ layer.

6. A perpendicular write head, as recited in claim 5, wherein the thickness of the $Al_2O_3$ layer is within the range 10-30 nanometers.

7. A perpendicular write head, as recited in claim 1, wherein the bilayer trailing shield gap layer is selected from the group consisting of: $Al_2O_3$, SiO2, SiC, SiOxNy, AlSiOx, Ta TaOx and TaN.

8. A perpendicular write head, as recited in claim 7, further including alumina dispersed around the main pole and below the trailing shield.

9. A perpendicular write head, as recited in claim 1, wherein the trailing shield is formed of a magnetic metal layer.

10. A perpendicular write head, as recited in claim 9, wherein the magnetic metal layer is NiFe.

11. A disc drive comprising:

A perpendicular write head for writing data onto tracks, each having widths defining a track width, the perpendicular write head having a main pole, trailing shield self-aligned with the main pole and bilayer trailing shield gap layer formed between the main pole and the trailing shield and acting as both a hard mask and a stop layer thereby improving track width control.

12. A disc drive, as recited in claim 11, wherein the bilayer trailing shield gap layer includes a Rhodium layer.

13. A disc drive, as recited in claim 12, wherein the thickness of the Rhodium layer is within the range 10-30 nanometers.

14. A disc drive, as recited in claim 11, wherein the bilayer trailing shield gap layer includes a hard mask.

15. A disc drive, as recited in claim 11, wherein the bilayer trailing shield gap layer includes an Al2O3 layer.

16. A disc drive, as recited in claim 15, wherein the thickness of the Al2O3 layer is within the range 10-30 nanometers.

17. A disc drive, as recited in claim 11, further including a trailing shield formed above the main pole and separated therefrom by the bilayer trailing shield gap layer.

18. A disc drive, as recited in claim 17, wherein the trailing shield is formed of a metal layer.

19. A disc drive, as recited in claim 18, wherein the magnetic metal layer is NiFe.

20. A disc drive, as recited in claim 17, further including alumina is dispersed around the main pole and below the trailing shield.

* * * * *